US006251017B1

(12) United States Patent
Leason et al.

(10) Patent No.: US 6,251,017 B1
(45) Date of Patent: Jun. 26, 2001

(54) GAME OR LOTTERY WITH A REWARD VALIDATED AND/OR REDEEMED ONLINE

(76) Inventors: David Leason, 176 E. 77th St., New York, NY (US) 10021; Scott L. Sullivan, 3 Garden Ridge Rd., Chappaqua, NY (US) 10514

( * ) Notice: Subject to any disclaimer, the term of this patent is extended or adjusted under 35 U.S.C. 154(b) by 0 days.

(21) Appl. No.: 09/295,943

(22) Filed: Apr. 21, 1999

(51) Int. Cl.$^7$ ........................................................ A63F 3/06
(52) U.S. Cl. ........................... 463/42; 463/25; 273/138.2; 273/139; 700/91; 705/14
(58) Field of Search ................................ 273/139, 138.2; 705/14; 700/91, 92; 463/40–42, 16–18, 25; 283/903

(56) References Cited

U.S. PATENT DOCUMENTS

| 5,373,440 |   | 12/1994 | Cohen et al. . |
|-----------|---|---------|----------------|
| 5,749,075 |   | 5/1998  | Toader et al. . |
| 5,772,510 |   | 6/1998  | Roberts . |
| 5,791,990 |   | 8/1998  | Schroeder et al. . |
| 5,791,991 |   | 8/1998  | Small . |
| 5,816,918 |   | 10/1998 | Kelley et al. . |
| 5,851,149 |   | 12/1998 | Xidos et al. . |
| 5,883,620 |   | 3/1999  | Hobbs et al. . |
| 5,892,827 |   | 4/1999  | Beach et al. . |
| 5,907,830 | * | 5/1999  | Engel et al. ........................... 705/14 |
| 5,924,907 |   | 7/1999  | Naftzger . |
| 6,173,267 | * | 1/2001  | Cairns .................................... 705/14 |

OTHER PUBLICATIONS

Silicon Alley Reporter, "Where's Beenz?," Issue 26, p. 78 plus magazine cover (vol. 3, No. 6, 1999).
Label from bottle of Powerade® brand bottle label, front and back (2 sheets).
Powerade.com/dinfo.html, "Download Screen Saver" installation and configuration instructions(1 sheet).
Powerade.com, Web pages from active window, including: "Are You Ready To Play," "The Play" with "The Play" with "show prize" button, "You Have Entered A Winning PIN Number," "Keep Playing Skill Challenge Contest," and "Keep Playing Skill Challenge Contest: First Steps" (each a screen print on 2 sheets; total 10 sheets).
Mypoints.com, Web pages including: "About MyPoints," "All About Earning with MyPoints," "All About Spending with MyPoints," "All About BonusMail®" "Our Technology," and "Our Partners" (all printed on Aug. 12, 1999; total of 8 sheets).

(List continued on next page.)

*Primary Examiner*—Benjamin H. Layno

(57) ABSTRACT

A method for conducting a promotional game or lottery in which the awards are access to one or more predetermined internet-based services or sites. Validation codes are distributed to customers on game cards or purchase receipts. The validation code is entered into a computer which is communicatively connected to the internet, and a number of e-points are awarded if the input validation code matches one of a plurality of validation codes stored at a remote site. The e-points are a measure of an amount of a benefit which is spent like money or elapses like time in response to usage of a designated internet service or site. The greater the number of e-points, the greater the benefit conferred upon the player. The e-points are exchangeable for limited access to the designated sites or services on the internet. The magnitude of the e-point reward may be based upon purchase transactions made in a retail store. Also disclosed is a method for encouraging a customer to go online and visit one or more designated internet sites and thereafter receive a benefit at a store but only if the customer first registers the validation code at one or more of the designated internet site(s).

12 Claims, 13 Drawing Sheets

OTHER PUBLICATIONS

Powerade.com, "Welcome to POWERWaDE.COM" Web page in active window (Screen print on 2 sheets, printed Jul. 20, 1999).

Powerade.com, "Enter your reference number please" Web page in active window (screen print on 2 sheets, printed Jul. 20, 1999).

Powerade.com/igrules.html, "Powerade Keep Playing Challenge" Official Rules (3 sheets, printed Jul. 20, 1999).

Catalinamktg.com/manufacturer/frm _main _instant.html, "In–Store Instant–Win Games" Web page (1 sheet, printed Jul. 12, 1999).

Cherry Coke label from two–liter bottle purchased May, 1999 (1 sheet).

Mtv.com/mtv/marketing/cherry_coke2/Web page (1 sheet, printed May 26, 1999).

Mtv.com/mtv/marketing/cherry_coke2/gameplay.html Web page (1 sheet, printed May 26, 1999).

Cherrycoke.com Web page (1 sheet, printed May 26, 1999).

Cherrycoke.com/welcome.html Web page (1 sheet, printed May 26, 1999).

Cherrycoke.com/1–create.html Web page (1 sheet, printed May 26, 1999).

Sevenup.com/html/promo/promounder.html Web page (1 sheet, printed May 26, 1999).

Realtimemedia.com/services/index/html "Promotional Services" Web page (2 sheets, printed Jun. 21, 1999).

Prizelink.com/who.html "We've Moved" Web page (2 sheets, printed Jun. 21, 1999).

Prizelink.com/prizelininfo.html "Who We Are" Web page (1 sheet, printed Jun. 21, 1999).

Prizelink.com/easymoney2/home.html "Easy Money!" Web page (1 sheet, printed Jun. 21, 1999).

Prizelink.com/easymoney2/works.html "How It Works" Web page (2 sheets (2nd is blank), printed Jun. 21, 1999).

Prizelink.com/easymoney2/participate.html "How To Participate" Web page (1 sheet, printed Jun. 21, 1999).

Prizelink.com/easymoney2/program.html "Program" Web page (2 sheets, printed Jun. 21, 1999).

Content.ubl.com/store/specials/scratcher/scratcher rules.html Web page (4 sheets, printed May 26, 1999).

* cited by examiner

GAME OR LOTTERY WITH A REWARD VALIDATED AND/OR REDEEMED ONLINE

FIELD OF THE INVENTION

The present invention relates to games of the type used in promotional campaigns or lotteries. The inventive method distributes game cards or receipts with codes to players, with the codes being validated and/or redeemed online.

BACKGROUND OF THE INVENTION

One form of promotional campaign that has been used to attract customers to stores revolves around the use of game pieces. Fast food chain stores in particular have distributed game pieces to their customers, with the goal of increasing sales by attracting more or repeat customers. The game pieces sometimes provide an instant reward and may include a portion that is combined with other game pieces to redeem a different award.

In one game, a perforated cover conceals a hidden reward. To play the game, the player removes the cover to reveal the reward. In another game, a scratch-off cover conceals a selection of potential rewards and the player exposes a selected reward by scratching-off the cover with a coin, fingernail, etc. These games have been used by a variety of retail stores and especially fast food chain stores. State lotteries have also used such games.

In conventional game-piece campaigns and lotteries, the action of the game is confined to the real-world (a.k.a. "dirt-world"), with the rewards comprising free food, prizes, or discounts. In the case of fast-food chain stores, the reward is typically a food item, for example, french fries or a hamburger. Such prizes are furnished by the franchisee, who may or may not be reimbursed by the game-sponsoring franchisor or corporation. If the franchisees are to be reimbursed, the game pieces must be collected from each franchisee, forwarded to a processing center, cleared, and a credit allocated to each respective franchisee. The small game pieces can be difficult to handle and processing the awarded prizes is costly.

At least one Burger King® restaurant franchisee has provided customers with access to the internet through computer terminals connected in his restaurant. As reported in The New York Times, customers receive a personal identification number (PIN) which entitles them to twenty minutes of internet access when they make a minimum purchase at the restaurant. Gambling and sex-oriented sites are blocked. The internet access provided to such customers is no greater than that of any other person who connects to the internet and the customer is not guided to any particular internet site. Further, the customer does not earn points or credits which permit access to sites or services which are otherwise restricted to members, subscribers, or viewers who pay a fee to access such sites or services.

There exists a need for an improved game in which rewards are enjoyed in the virtual world, such as at an internet site. Also needed is an improved game which provides secure distribution and redemption of game pieces and/or incentives to return to the source of the game without the customer having to identify himself. Further, franchisee's are in need of an improved game to promote sales and customer interest wherein the rewards are disseminated by the franchisor. Moreover, store owners and franchisees alike are in need of an improved method to stimulate interest in their web sites and to encourage customers from the web site to their stores. The present invention satisfies these and other needs.

SUMMARY OF THE INVENTION

The present invention provides a method in which rewards are distributed to players with a code that permits them to validate the reward online and, if the reward is in the form of access to otherwise restricted internet sites or services, to redeem the reward online. The present invention is an improvement over conventional promotional games and lotteries in that it provides players with an incentive to visit a designated internet site or service. In further aspects, the invention provides an incentive for players to visit a predetermined retail store. In this respect, consumer traffic is directed to a designated internet site or service and then to a store, for example, the store where the game card or receipt was initially obtained. Thus, the present invention provides consumers with a reward for interacting with the internet site and/or stores of the game sponsor and its marketing partners. The reward can be validated, redeemed, and enjoyed without the customer's identity being disclosed.

The incentive provided to the player may take the form of a reward of limited access to one or more designated internet-based sites or services. Such a reward can include limited use of a video game, search engine, or other commodity or entertainment available at designated sites on the internet, or limited access to magazine articles, research reports, music, or other commodity or entertainment available at designated sites on the internet. The reward can also be a discount or benefit which is received at a retail store after validating the game card or receipt at a preselected internet site.

In one respect, the invention provides a method for encouraging a customer to go online and visit one or more designated internet sites. The customer is provided with a game card which has a validation code that can be entered at such internet site(s). The customer is rewarded for visiting the designated internet site(s) with a benefit that can be redeemed at a predetermined store, for example, at a dirt-world store. To earn the benefit, the validation code must be received at the designated internet site(s) prior to visiting the predetermined store. Once the validation code is received, it is voided. In order to be voided, the code may need to be entered at more than one designated site. The benefit is provided to the customer upon tendering the game card if, at the predetermined store, the voided status of the game card is confirmed.

In another respect, a method for conducting a promotional game or lottery is described in which the awards include access to one or more predetermined internet-based services or sites. This method provides a customer with a game card which has a visible validation code. The customer inputs the validation code into a machine such as a computer connected to the internet, and is awarded with a number of e-points if the input validation code matches one of a plurality of validation codes stored at a remote site. The e-points are exchangeable for limited access to predetermined sites or services on the internet.

In yet another respect, the invention provides a method for rewarding customers with access to designated internet sites and services based upon purchase transactions made in a retail store. The customer is awarded a number of e-points and is provided with an award identifier. The award identifier is input by the customer into a machine, for example at a computer as described above. The customer is then provided with access to the designated internet sites or services in exchange for the e-points that were awarded. The e-points are decremented in response to use of such designated sites or services.

The e-point awards can be a reward of a predetermined number of e-points or a dynamically determined number of e-points. Customers may aggregate the e-point awards from plural game cards. The number of e-points may be decremented in response to use of the selected site or service, and the customer's access to the selected site or service may be terminated when the e-points run out.

The validation code can take many forms. It may be a single string of alphanumeric characters. Alternatively, the validation code may include a master-code portion and a sub-code portion, and each game card can have a set of sub-codes from which only one sub-code may be entered. This permits a single game card to offer a selection of codes to choose from and adds to the excitement of the game. The validation codes may include one or more icons which must be matched to images displayed on the customer's web browser once the customer accesses the remote site.

The features and advantages of one arrangement or embodiment disclosed herein can be applied to other arrangements or embodiments of the invention. The foregoing and other aspects of the invention can be appreciated from the drawing Figures and Detailed Description.

DETAILED DESCRIPTION

By way of overview and introduction, the present invention is described in connection with several arrangements in which validation codes are distributed to players for validation at a designated internet site. A number of e-points may be awarded to the player when the validation code is registered at the designated internet site. In other games, a prerequisite to receiving a benefit at another internet site or a dirt-world store is that the validation code be registered online. As described below, players validate their e-point awards or register their validation codes by entering the code into a machine at their homes, offices, or some other location—typically outside of the store at which the game card or receipt was received. E-point validation preferably occurs at the time of e-point redemption.

The term "e-point" as used in this patent specification refers to a measure of an amount of a benefit which is spent like money or elapses like time in response to usage of a designated internet service or site. The greater the number of e-points, the greater the benefit conferred upon the player.

In a game or lottery in which pre-printed game cards are used, the award of e-points from a given game card may be predetermined for each card. Alternatively, the number of e-points associated with a pre-printed game card can be dynamically determined at the time of award redemption. The same is true when the game card is a receipt from a purchase transaction. On the other hand, an award of e-points can be determined based upon details from a purchase transaction of a customer. As an embellishment upon any of these arrangements, the game card or receipt can be tendered at a store and will confer a benefit on the holder if it was validated online, regardless of whether e-points were awarded. In other forms, "e-points" are distributed to players from a display connected to an interactive machine such as the machine 304 described below. These game arrangements are discussed below.

A. Pre-Printed Game Cards with a Predetermined Number of E-Points

Figure 1:
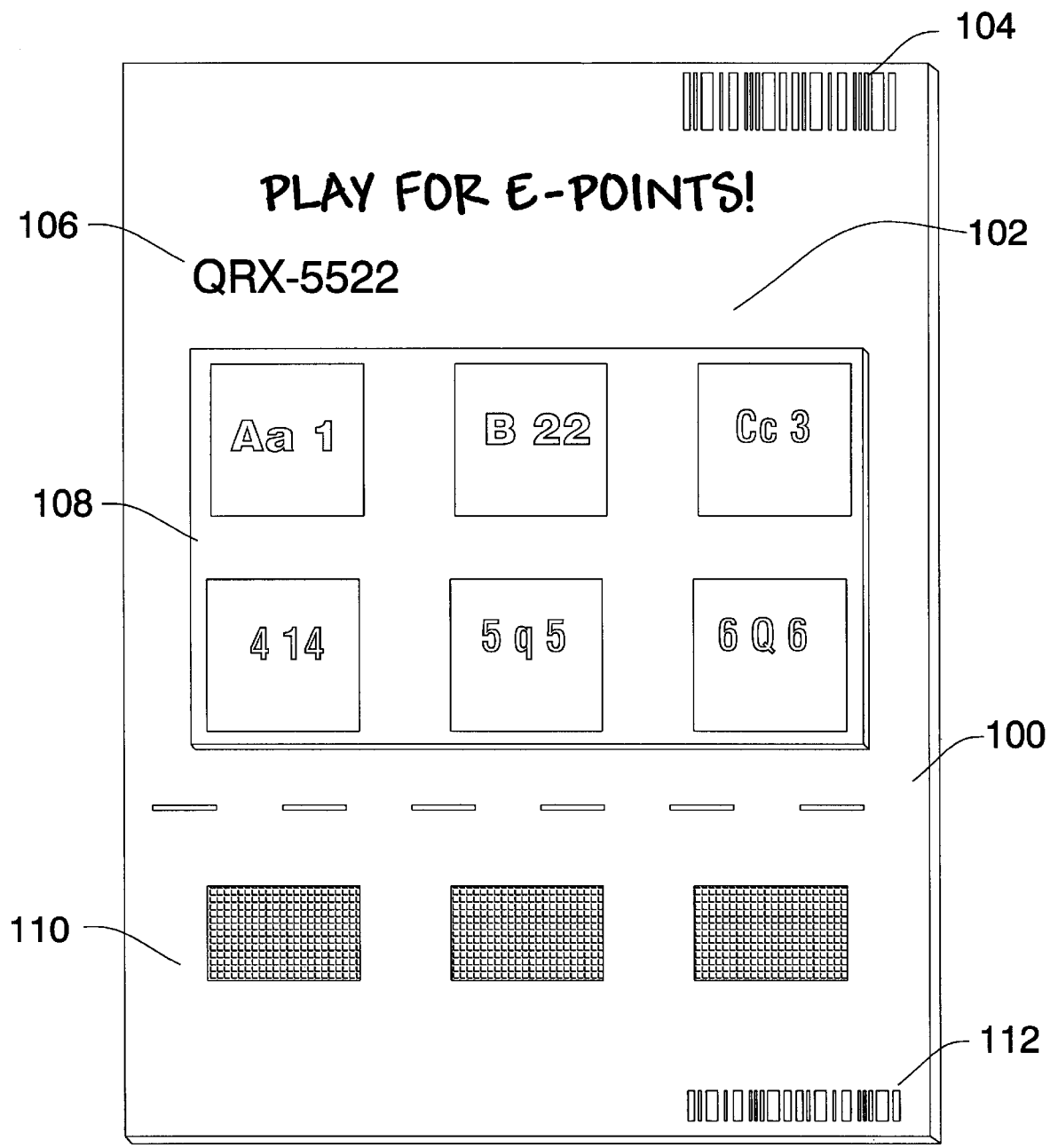
FIG. 1 illustrates a game card supporting a validation code consisting of two alphanumeric portions that may be used in the present invention.
Figure 2:
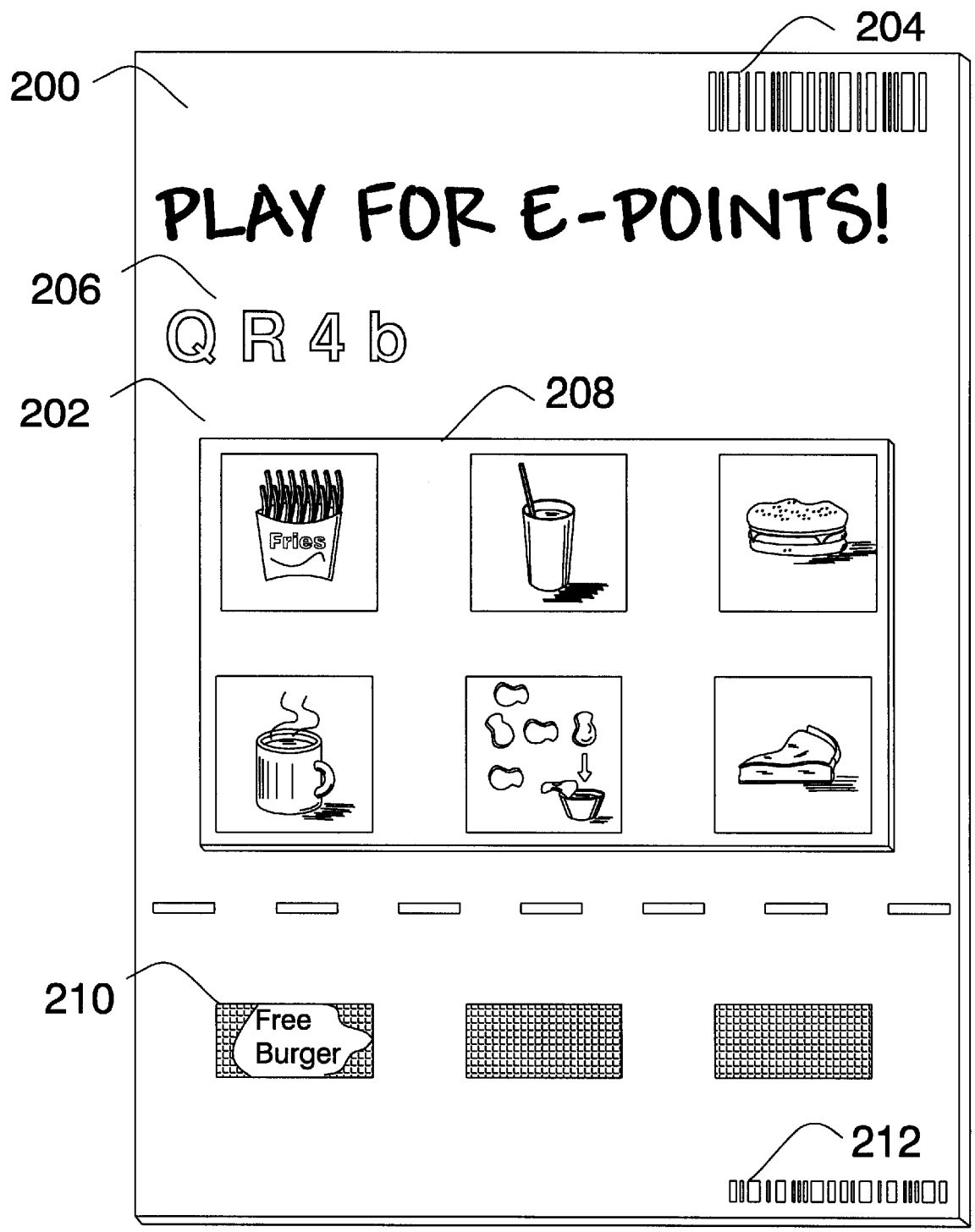
FIG. 2 is a variation of the game card of FIG. 1, in which the validation code includes an alphanumeric portion and one of a series of icons.

In FIGS. 1 and 2, two variations of a game card are illustrated. A series of game cards such as the type shown in either FIGS. 1 or 2 together comprise a particular game which may include 600 million or more game cards. The game cards are to be distributed to a great number of players across a particular state or the entire United States, and, in contrast to prior games, the reward on these game cards is redeemed outside of the store and without manual intervention of a store clerk. When the reward is in the form of limited access to an internet service or site, there is no paper processing required to redeem and provide the reward to the player, and there is no need to reimburse a franchisee or store for distributing a winning game card.

The pre-printed game cards 100, 200 of FIGS. 1 and 2 support a visible validation code 102, 202 which identifies each card in the series. In addition, the game cards may further include a machine-readable code 104, 204 (e.g., a bar code and/or magnetic ink) for control, tracking, or in-store award purposes. The validation code preferably comprises a master-code 106, 206 and a set of associated sub-codes 108, 208.

The exemplary game cards 100, 200 further include a conventional scratch-off type instant award attached to a perforated portion 110, 210 of the game card. The perforated portion includes several concealed choices, one or more of which can provide the player with an instantly redeemable reward which is revealed by removing a scratch cover. The game card 200, for example, includes a "free burger" award, as shown where the scratch cover has been removed. A machine-readable code 112, 212 also is provided on the perforated portion 110, 210 for tracking and clearing the instant reward. Thus, if the perforated portion is separated from the remainder of the card, for example, to redeem the instant award, the nature and value of the award as well as the card from which the award was granted can be traced by the franchisee, franchiser or other processing center. The machine-readable code 112, 212 further may be usable to identify the store to which that game card was initially distributed. The perforation and instant award are optional features.

Figure 3:
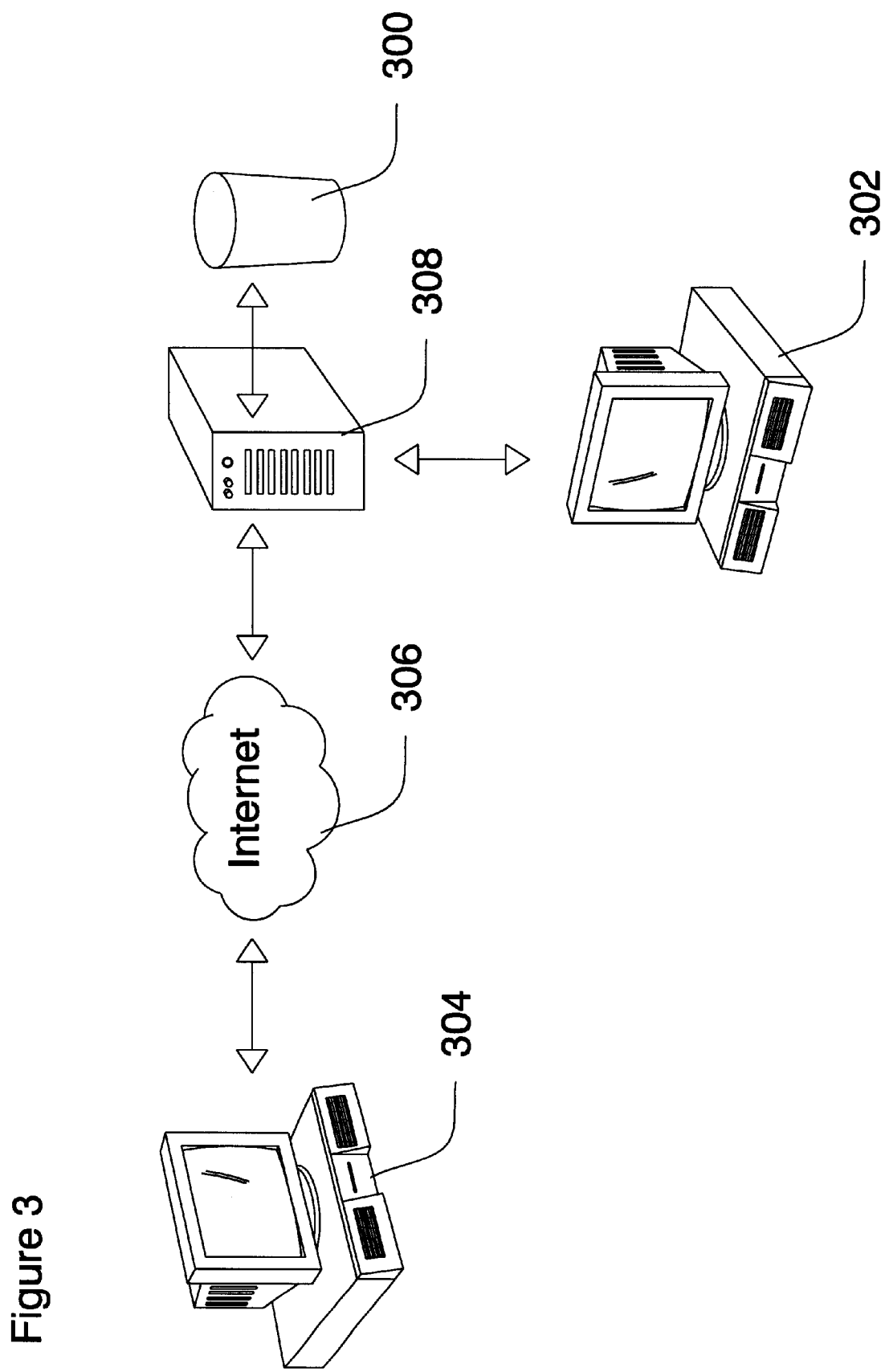
FIG. 3 illustrates a hardware arrangement by which a player can validate and/or redeem a reward online.

In accordance with one arrangement of the invention and as shown in FIG. 3, a relationship table is established and stored in a database 300 which associates the validation code of each game card in the series with a predetermined number of e-points. The relationship table is established prior to distributing the game cards in a given series. The relationship table can be established in a variety of ways, and is preferably established using a programmed computer. As an illustration, the computer generates a multiplicity of unique validation codes, each of which is included in a separate row of the relationship table. This may be done, for example, by cycling through the various permutations and either randomly selecting from among the permutations the validation codes to be included as a row in the relationship table, or deselecting certain permutations and including the remainder as rows in the relationship table until the number of validation codes and rows in the relationship table equals or exceeds the number of game cards to be included in the series. Thereafter, the number of each type of award is set and assigned to selected validation codes. For example, the award may be randomly assigned to a validation code or, equivalently, assigned to a row in the relationship table. That row of the relationship table and that validation code need not be considered further (e.g., a flag may be set that the validation code has been assigned a number of e-points, or the presence of data in the e-point field can be tested). In this manner, each of the validation codes is assigned an e-point award until there are no more e-point awards to give out. At that time, any unassigned validation code may be accorded an arbitrary award of e-points (e.g., zero). In the event that master-codes and sub-codes are used, the award assignment can be made on a game-card by game-card basis to ensure that each card has a designated pattern of awards (e.g., one great award, one zero award, and the remainder moderate to small awards). Techniques known in the lottery industry also can be applied to establish a set of game cards with an appropriate distribution of awards.

The actual number of e-points awarded for a given game card need not be printed or shown on the game card. Rather, the player can discover the magnitude of the reward by contacting a host system 302 which manages the database 300. The player contacts the host system using a machine 304 such as a personal computer and a modem or other device which enables bidirectional communication between the host system 302 and the machine 304. The connection is preferably made over a public network, and most preferably over the internet 306. The host system 302 includes a server 308 which manages redemption requests from a multiplicity of players, each connecting to the system using machines 304. The hardware is conventional and forms no part of the present invention. The player preferably uses any one of a number of standard web browsers such as the Internet Explorer®, a product of Microsoft Corporation, Redmond, Wash., and the server is preferably compliant with a variety of web browsers.

Figure 4:
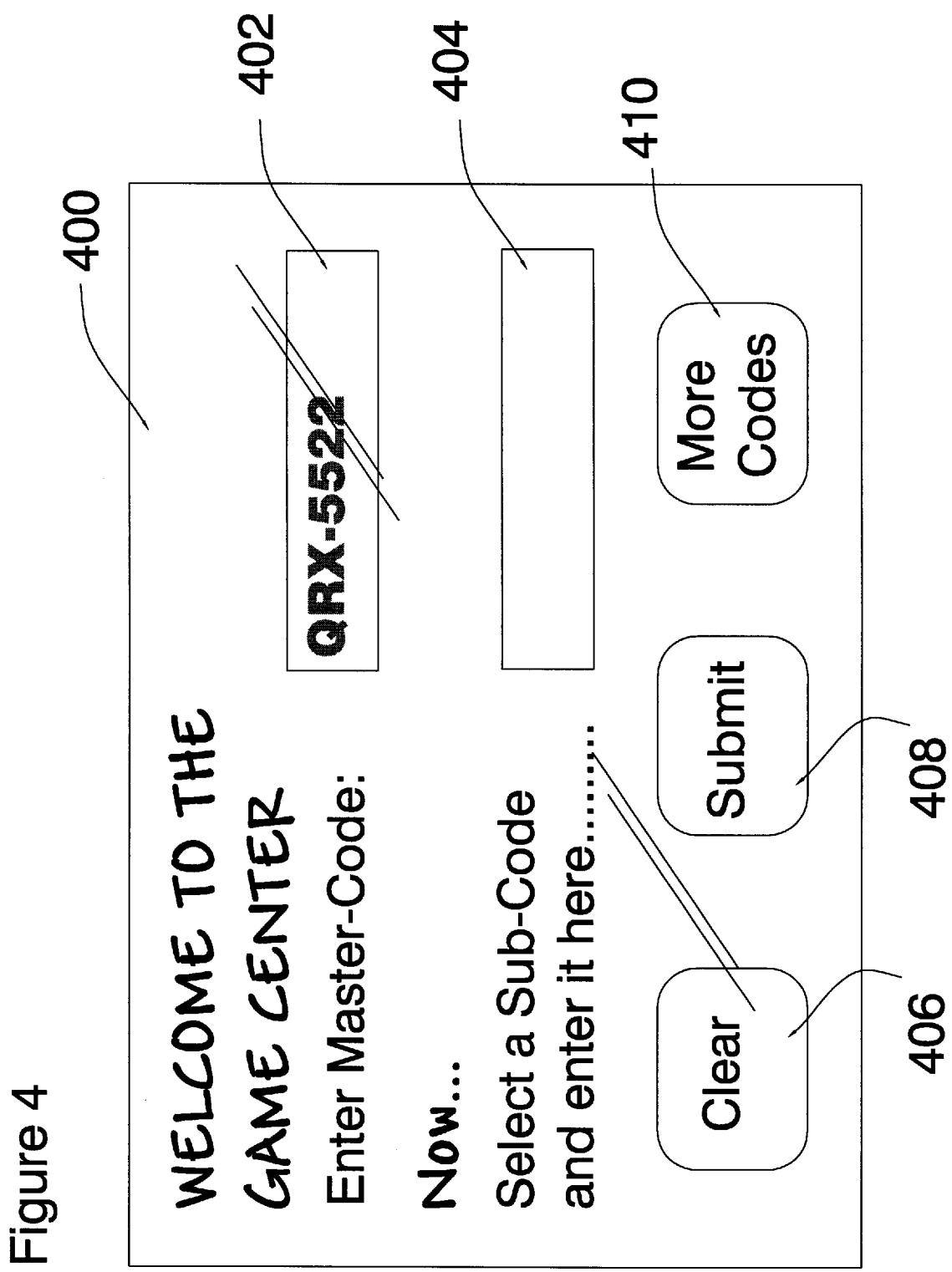
FIG. 4 illustrates a redemption form, partially filled in by a player, for submitting a validation code.

As shown in FIG. 4, a redemption form within a page 400 is provided by the hosting web site and permits the player to enter the validation code into the machine 304 after connecting to the host system 302. The form includes fields suitable for entering the validation code, such as master-code field 402 and sub-code field 404, and buttons which permit the form to be cleared (button 406) or submitted (button 408) and which permit the player to enter additional validation codes from any other game cards he or she may have (using the more-codes button 410). In particular, the more-codes button 410 permits the player to aggregate e-point awards to increase the magnitude of the reward that he or she can use. Of course, the more codes button can be provided on a different page, for example, a page or frame which is displayed after submitting the validation code from a particular game card. Upon submitting the codes, a further page may be displayed from which the player can select from a list of predetermined or designated internet sites and services to access and use in exchange for some or all of the awarded e-points.

The validation code contained on each game card 100, 200 preferably comprises a master-code 106 and a set of sub-codes 108. The validation code displayed on each game card is stored in the relationship table within a machine, for example, within memory or the storage device 300 of the server 308. By entering the master-code 106 from a game card and a selected one of the sub-codes 108 into the redemption form 400 at the computer 304 (a first machine), a complete validation code is provided which can reference a predetermined e-point award through the relationship table. In other words, the relationship table associates a predetermined number of e-points with each of the sub-codes 108 such that a selection by the player of a particular sub-code 108, in combination with the master-code, determines the reward.

In Relationship Table A below, the master-code and sub-codes for two game cards are shown. In particular, game card 100 of FIG. 1 is the first game card in the Relationship Table A. The game card 100 has one master code 106 which is associated with a set of six sub-codes 108. A single game card 100 provides the player with a selection of six choices from which one combination master-code 106 and sub-code 108 can be entered in an attempt to win a reward. The redemption form 400 of FIG. 4 has the master-code field 402 completed with the master-code 106 from the game card 100. The player now can select one of the sub-codes 108 to enter into the sub-code field 404 to register the validation code and obtain the e-point reward. Of course, fewer or more sub-codes 108 can be associated with each master-code 106 to decrease or increase the number of choices provided to the player from a single game card.

TABLE A

| | RELATIONSHIP | | | | |
|---|---|---|---|---|---|
| Card No. | Master-Code | Sub-Code | e-Points | Card Void? | Store No. |
| 100 | QRX-5522 | Aa1 | 5 | N | 3400 |
| 100 | QRX-5522 | B22 | 10 | N | 3400 |
| 100 | QRX-5522 | Cc3 | 15 | N | 3400 |
| 100 | QRX-5522 | 414 | 5 | N | 3400 |
| 100 | QRX-5522 | 5q5 | 5 | N | 3400 |
| 100 | QRX-5522 | 6Q6 | 0 | N | 3400 |
| 101 | AbD-qqR4 | french fries | 5 | Y | 3401 |
| 101 | AbD-qqR4 | shake | 5 | Y | 3401 |
| 101 | AbD-qqR4 | burger | 5 | Y | 3401 |
| 101 | AbD-qqR4 | coffee | 120 | Y | 3401 |
| 101 | AbD-qqR4 | chicken dips | 30 | Y | 3401 |
| 101 | AbD-qqR4 | apple pie | 0 | Y | 3401 |

Relationship Table A further illustrates that different predetermined numbers of e-points can be earned from a given game card, depending on which sub-code is selected. For example, the game card 100 has six sub-codes 108 which reward the player between 0 and 15 e-points, depending on which sub-code is entered into the sub-code field 404 of the redemption form 400. The game card 101 awards between 0 and 120 e-points, again depending on which sub-code is entered into the redemption form. Because the number of e-points to be awarded varies from sub-code-to-sub-code and from game-card-to-game-card, there is an element of surprise which subsists until the player enters these codes at the computer station.

The method according to this arrangement of the invention is now described with reference to the process flow of FIG. 5. At step 500, a relationship table such as the Relationship Table A above is established which correlates an e-point award with a multiplicity of master-codes and their associated sets of sub-codes. The contents of the relationship table are stored in the database 300. The game cards are distributed to players at step 520 in any conventional manner, for example, at a point of sale terminal in a retail store, in a newspaper, by mail, or in a page, frame or banner displayed at an internet site. The players attempt to redeem a reward by entering the master-code and a selected one of the set of sub-codes which appear on the same game card. The master-code and the selected sub-code are received at step 530 at the machine 304 by entering that information into the redemption form 400 and posting it. At step 540, the validation codes received from the posted redemption form are compared against the data in the relationship table to determine if the input master-code and the selected sub-code are included in the database 300. If they are, then the validation code entered by the player appears on a game card in the series and the player is presumed to possess an actual game card. Thus, the comparison at step 540 better ensures that the player possesses the game card having the received codes and reduces the risk of fraudulent redemption. In the event that the entered master-code is not associated with the selected sub-code in the relationship table, then at step 550 the player is requested to re-enter the master-code and sub-code using the redemption form 400. The user may be permitted only a limited number of attempts (e.g., three) to enter the correct codes to minimize and inhibit code hacking.

If the master-code and the selected sub-code entered into the redemption form 400 are associated with one another in the database 300, then at step 560 a check is made to determine whether the game card has already been used. Preferably, a game card can only be used once and then it is exhausted or void. To "use" the game card and exhaust it, a player must enter a master-code and a corresponding sub-code that are associated in the relationship table. Thus, when a player enters the correct codes and the card is not void, he or she will be awarded at step 570 the predetermined number of e-points associated with the entered codes. Entry of the incorrect code directs the process flow to step 550 for code re-entry and the game card is not voided.

As shown in the relationship table above, a predetermined number of e-points is associated with each sub-code as a row entry in the table. The e-point award, if any, is in the amount specified in the row entry of the relationship table that includes the entered master-code and sub-code. A simple search algorithm using the master-code as the search criterion identifies which game card the player possesses and another search using the sub-code as the criterion identifies which e-point award is to be rewarded to the player.

After awarding the e-points, the master-code and preferably (but optionally) each of the sub-codes associated with that master-code are flagged as void, at step 580. The player is then invited at step 590 to spend the awarded e-points at a designated internet service or site (by pressing the submit button 408), or can enter additional validation codes back at step 530 (by pressing the more-codes button 410). Because the master-code has been marked as void, if it is subsequently entered at step 530, it will still satisfy the validity test at step 540 (because the codes are valid ones), but will fail the "card void" test at step 560. Upon failing the "card void" test, the system provides the player with one or more chances to enter correct and non-void validation codes. No reward is provided if the game-card is void. The order of these steps can be varied somewhat as understood by those of skill in the art (for example, steps 570 and 580 can be performed in reverse order).

Figure 6:
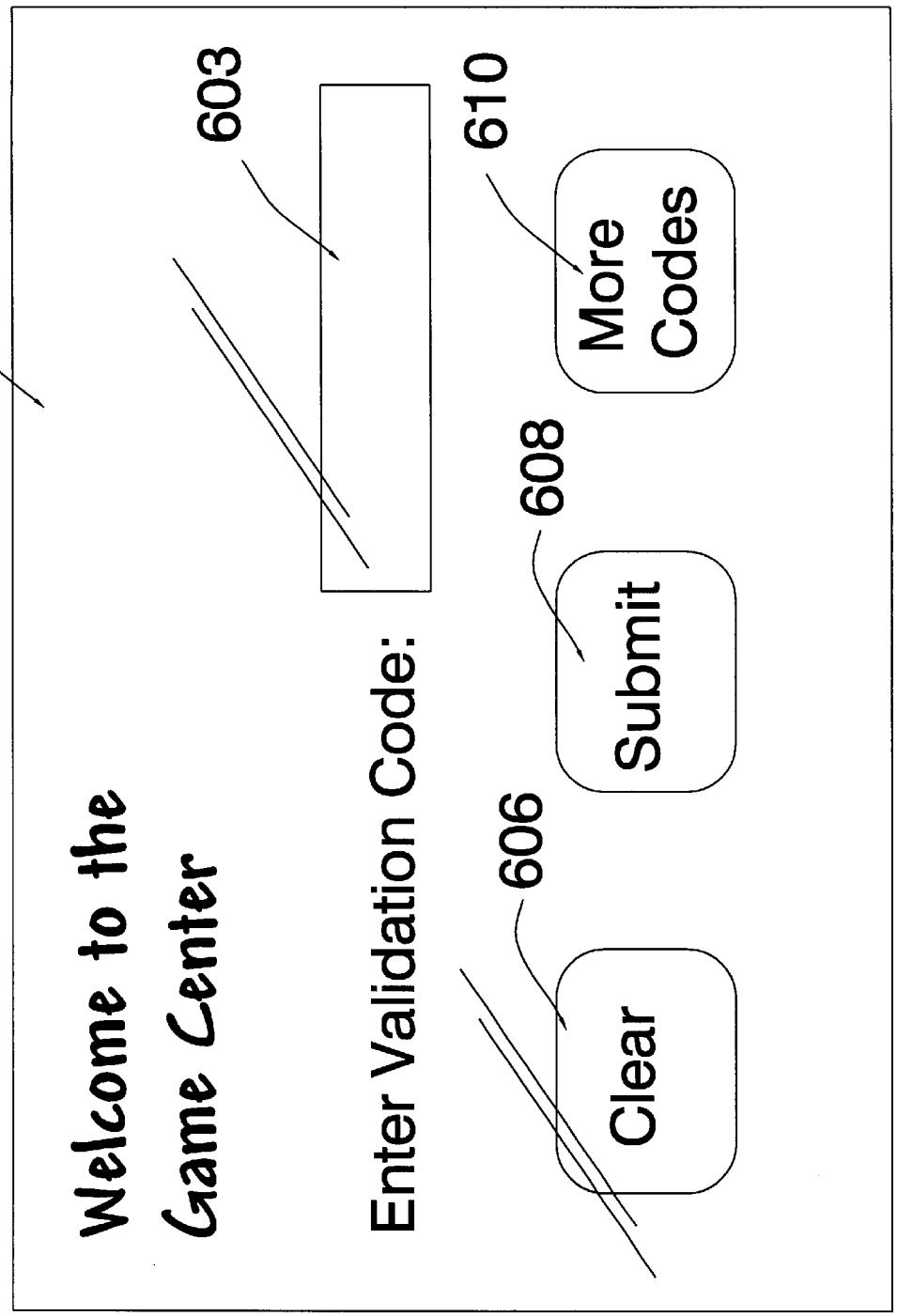
FIG. 6 illustrates another redemption form for submitting a validation code.

It should be understood that other relationship tables can be used to define a relationship between a validation code and a predetermined number of e-points. What is important to this embodiment of the game is that a known reward be correlatable through the relationship table with a particular input code. Thus, a single validation code can be used to provide the same result as using separate master-code and sub-codes: instead of separately entering into the machine 304 the master-code and sub-code, a validation code can be entered in one step or in one continuous series of steps (see, e.g., the validation code 1102 of FIG. 11). A single validation code is entered, for example, using a redemption form 600 of the type shown in FIG. 6. The validation code is entered in a validation-code field 603, and any additional validation codes are entered by pressing the more-codes button 610. If the player makes an error in entry, the clear button 606 will clear the form. Otherwise, the submit button 608 causes the validation codes to be processed and causes a subsequent page to be displayed which permits the player to select an internet service or site from a selection of designated services and sites.

Figure 11:
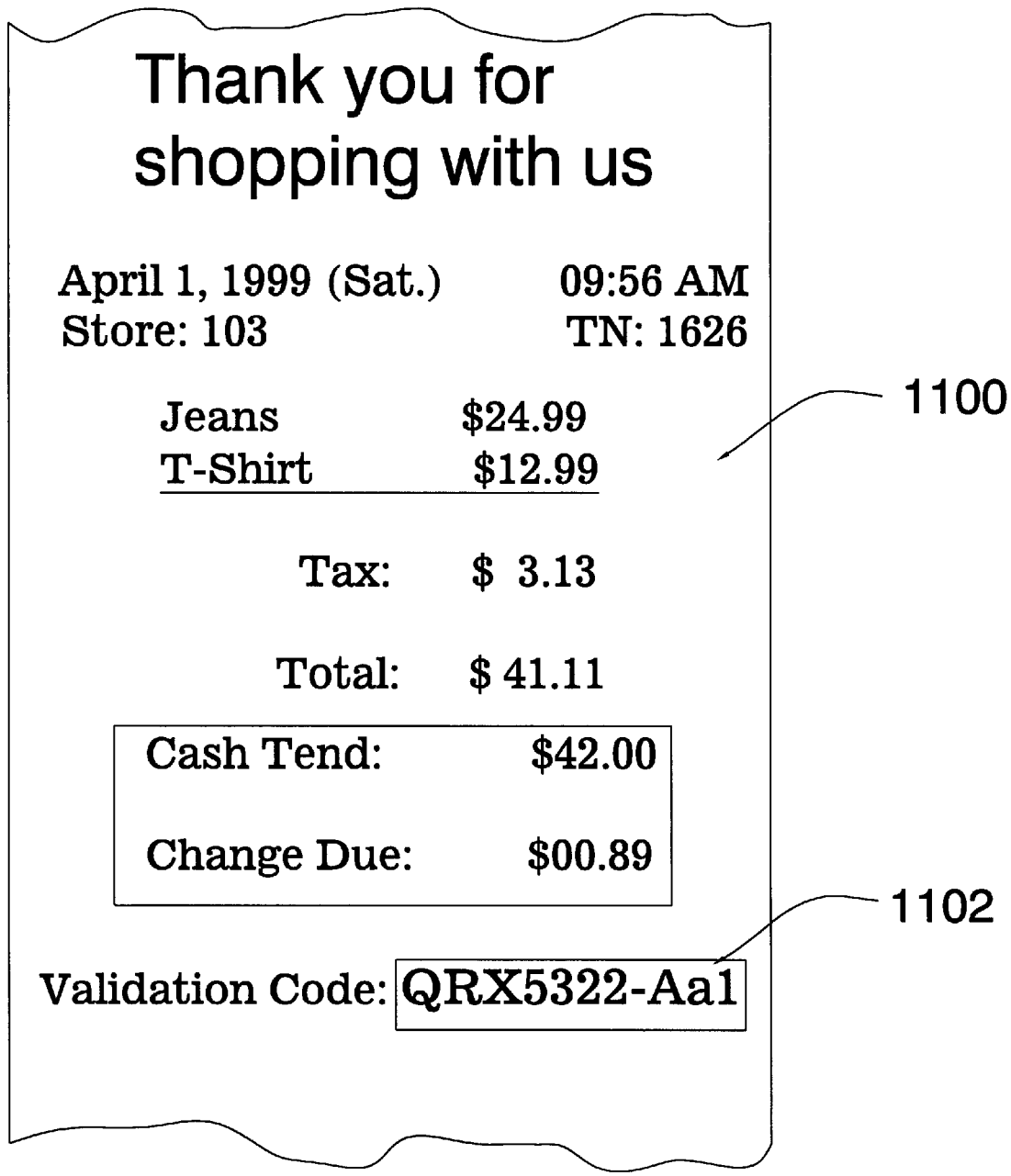
FIG. 11 illustrates a variation on the printed receipt of FIG. 9.

The single validation code entered into the redemption form 600 can be processed by the host system 302 in the same manner as the separate master-code and selected sub-code, substantially as described above. The database 300 in this arrangement stores a relationship table such as Relationship Table B shown below. That table shows for a typical game card 100A the association between the single validation code and the number of e-points to be awarded. The game card 100A provides the player with a choice of six validation codes, only one of which can be redeemed using the redemption form 600 prior to the game card 100A being voided. However, only one validation code need be provided on a given game card, as shown in FIG. 11.

TABLE B

RELATIONSHIP

| Card No. | Validation Code | e-Points | Card Void? | Store No. |
| --- | --- | --- | --- | --- |
| 100A | QRX-5522-Aa1 | 5 | N | 3400 |
| 100A | QRX-5522-B22 | 10 | N | 3400 |
| 100A | QRX-5522-Cc3 | 15 | N | 3400 |
| 100A | QRX-5522-414 | 5 | N | 3400 |
| 100A | QRX-5522-5q5 | 5 | N | 3400 |
| 100A | QRX-5522-6Q6 | 0 | N | 3400 |

The first seven characters of the validation code for each of the choices on the game card 100A are preferably the same and uniquely assigned so that each of the validation codes of a particular game card can be flagged as void once any of the validation codes has been entered into the redemption form 600. As in the prior example, different numbers of e-points can be earned from one game card, depending on the validation code that is selected by the player and submitted for matching at the host system 302.

Figure 7:
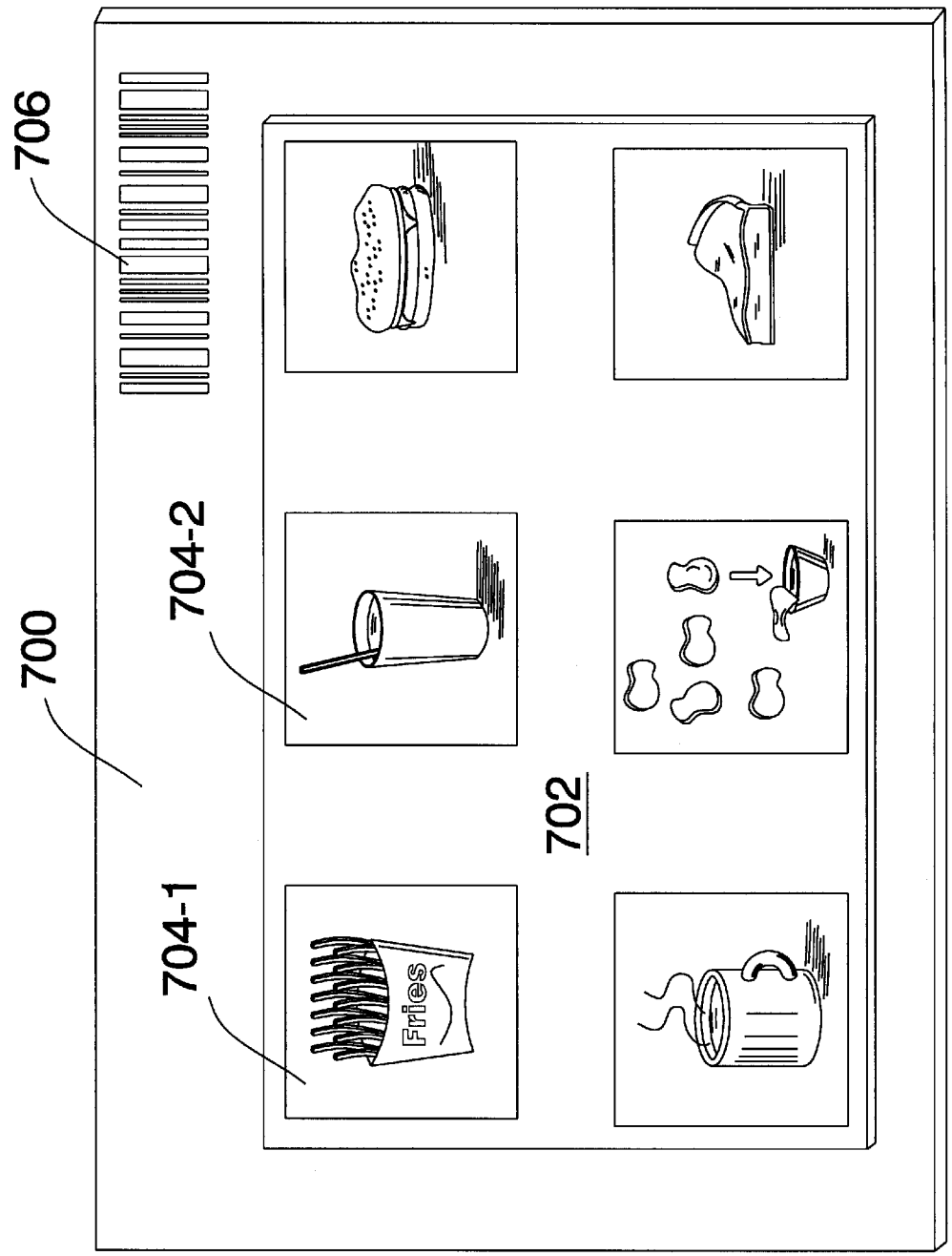
FIG. 7 illustrates a game card supporting a sequence of icons as the validation code.

In lieu of characters, the validation code (or the master-code, the sub-codes, or both) may take the form of icons or images. With reference now to FIG. 7, a game card 700 is illustrated which has a validation code 702 consisting of an arrangement of six icons 704-1, 704-2, . . . , 704-6. In addition, the game card includes a machine readable code 706. As with the game card 100 of FIG. 1, the player validates the game card and redeems the e-point reward, if any, by entering the validation code into a redemption form presented on a display of the machine 304. A suitable redemption form for inputting icons is shown in FIG. 8.

Figure 8:
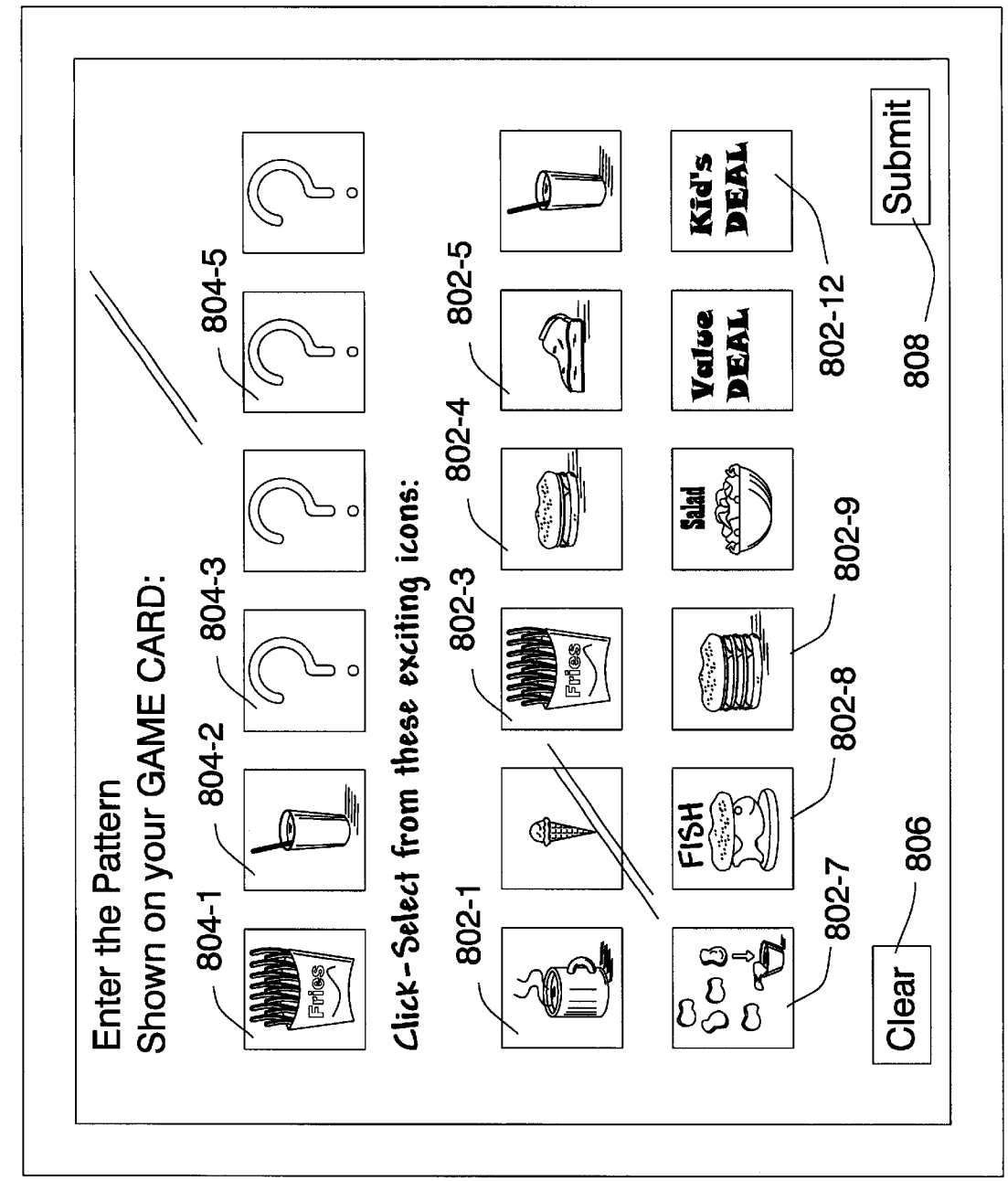
FIG. 8 illustrates a redemption form suitable for submitting the sequenced icons from a game card of the type shown in FIG. 7.

FIG. 8 illustrates a redemption form 800 which displays a plurality of icons 802-1, 802-2, . . . , 802-n. Preferably, there are more icons 802 displayed in the redemption form than are printed on any game card 700. Using a mouse or other input device connected to the machine 304, the player selects six icons in succession from among the icons 802 in the redemption form by clicking a mouse button when the cursor is positioned over the icon. Each time the mouse button is pressed, an icon 802 is displayed as a code entry 804 in the form. Standard graphical user interface (GUI) programming and function calls are used to determine which icons were selected by the player to be displayed as a code entry 804 in the form 800.

With further reference to FIG. 8, the player has click-selected from among the icons 802 the first two icons 704-1 and 704-2 that appear on the game card 700. As a result, code entries 804-1 and 804-2 depict those two icons from the game card. The player continues click-selecting icons from among the icons 802 to recreate the pattern printed on his or her game card 700. During code entry, errors can be cleared using the clear button 806. When all six (or however many) icons 704 have been correctly entered so as to match the arrangement on the game card, the player submits the validation code using a submit button 808. As described above, additional codes can be entered by signifying to the host system 302 that the player has more game cards. The more-codes button can be provided on the redemption form 800 or can be part of a further page or frame.

A particular benefit arising out of the use of game cards having icons on them is that the players interact with the products of the game sponsor and so the products are brought to the customers' respective minds outside of the store or conventional advertising environment.

B. Pre-Printed Game Card with Dynamically Determined Number of E-Points

The relationship tables A and B described above associate a predetermined number of e-points with each validation code, whether the validation code comprises a single code or has separate master-code and sub-code portions. However, the invention is not so limited. The codes may be used simply to validate or register the game card in the host system 302 (see Section E below), or may be assigned a number of e-points at the time that they are submitted for redemption.

Figure 5:
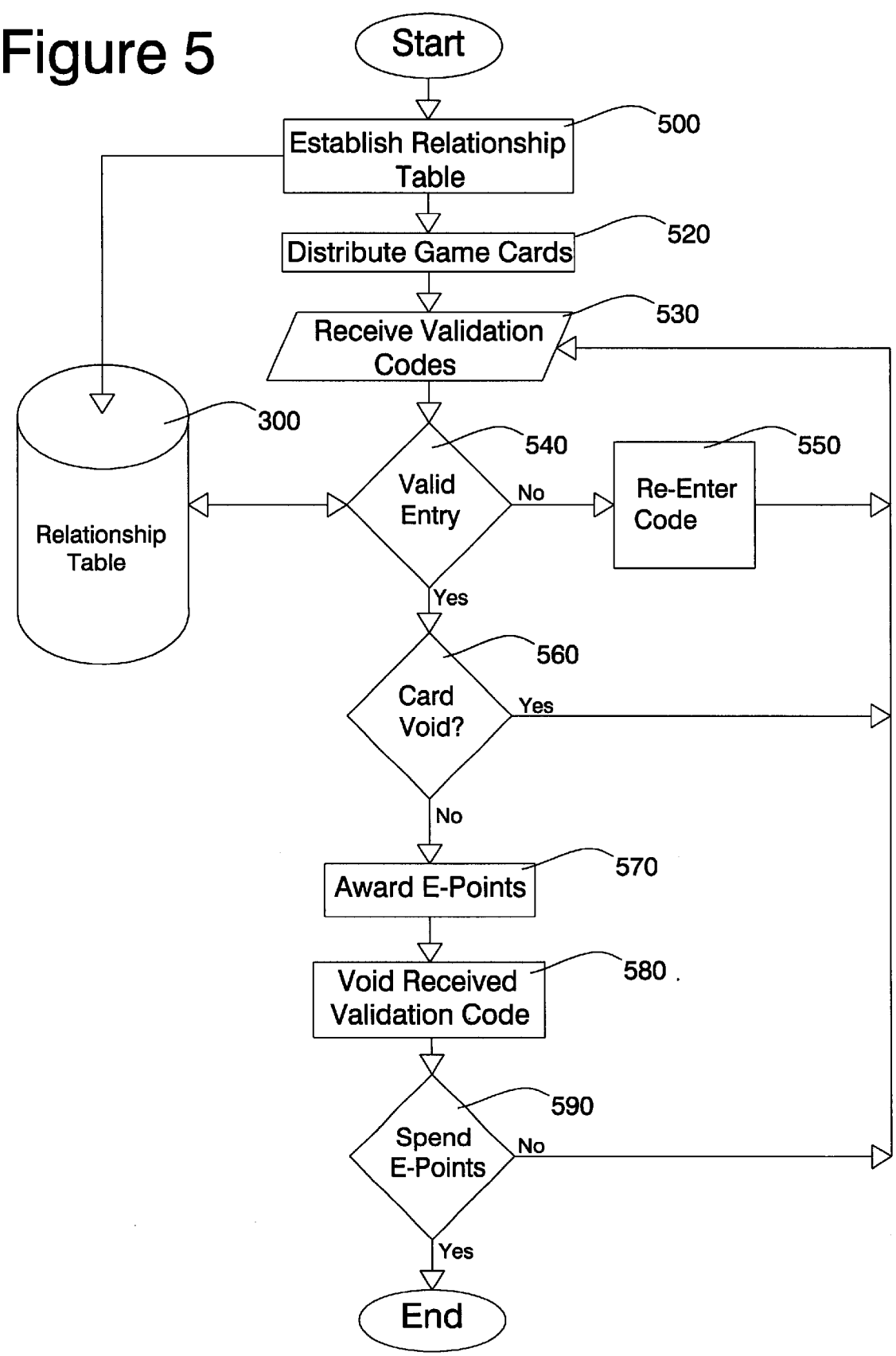
FIG. 5 illustrates a flow diagram in accordance with a preferred method of the invention.

Assuming that e-points are to be awarded, the validation code can be entered as previously described in accordance with the steps illustrated in FIG. 5. However, at step 570, the e-points awarded are not a predetermined number associated in any table with the input validation code. Rather, the number of e-points awarded is determined dynamically, for example, using a random number generator (RNG) or a pseudo-random number generator (PRNG). Known RNG and PRNG functions can be used by the host system 302 by a conventional function call to that routine which returns a number within prescribed limits (e.g., between 0 and 120). The number returned by the routine is then awarded at step 570 to the customer.

The number of e-points awarded to a player can be determined other than randomly, for example, more points awarded to first corners, frequent shoppers, etc. What is important to this alternative embodiment is that the number of e-points awarded are assigned at the time that the player redeems the validation code rather than at an earlier time such as when the relationship table is established. Thus, a relationship table in accordance with this embodiment of the invention would be similar to Relationship Tables A and B above, except there would be no need to store, access, or associate a number of e-points with each validation code.

Figure 9:
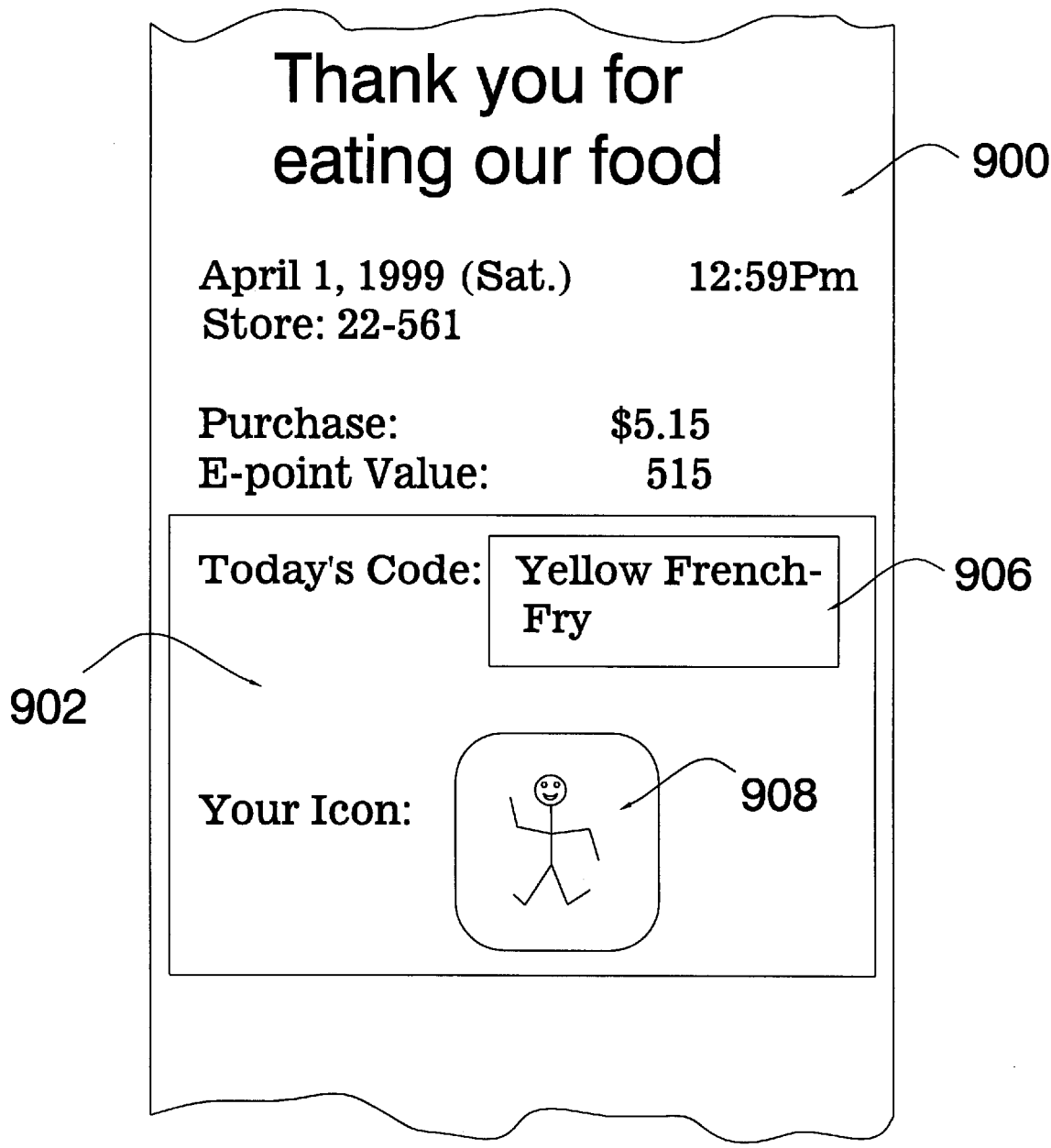
FIG. 9 illustrates a receipt upon which a validation code is printed in accordance with a second embodiment of the invention.

C. Purchase Transaction Receipt with Predetermined or Dynamically Determined Number of E-points In lieu of pre-printed game cards, the method of the present invention may have the validation codes distributed to players on a receipt printed as a result of a purchase transaction. FIG. 9 illustrates an exemplary receipt which includes a validation code 902 consisting of a master code 906 ("Today's Code") in the form of an string of characters and a sub-code 908 ("Your Icon") in the form of a stick figure image. The printed receipt 900 is similar to the pre-printed game card 200, and may include plural icons. The receipt typically includes other information including one or more of the following: the amount spent, the items purchased, the date, day, time, store number, transaction number ("TN"), cash tendered, and change given. If a credit or debit card is used, the receipt may include a portion of the card number printed on the receipt to identify the card that was used, as well as other card-related information (card holder's name, whether cash was given back to the customer, etc.).

Figure 10:
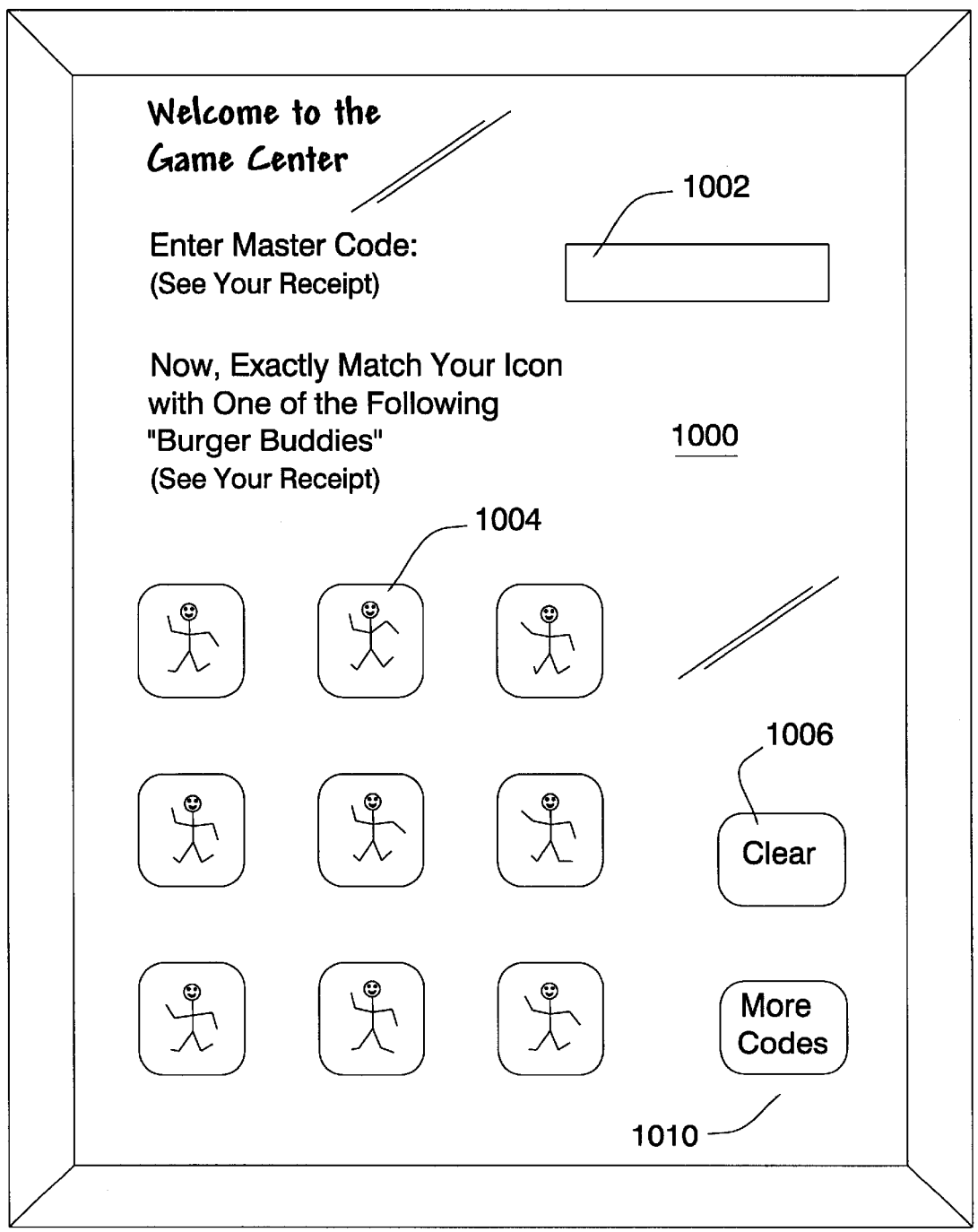
FIG. 10 illustrates a redemption form suitable for submitting validation codes from receipts of the type shown in FIG. 9.

The receipt 900 indicates that on Apr. 1, 1999, the customer spent $5.15 and earned 515 e-points which may be redeemed using a suitable redemption form, such as the redemption form 1000 of FIG. 10. Upon accessing the host system 302, the customer can enter the master code 906 ("Yellow French-Fry") in the master-code field 1002 and click-select the icon 1004 in the sub-code portion of the form that corresponds to the icon 908 printed on the receipt 900. The e-points are awarded if the entered master-code and sub-code are associated in a relationship table, such as one of the above-described relationship tables. As with the previously described forms, the customer can clear the fields using the clear button 1006 or input additional codes using the more-codes button 1010.

A variety of icons can be printed on the receipt 900 to make it difficult for one person to advise another of the proper code. In addition, the display of icons (sub-codes 1004) in the redemption form 1000 can be randomly shuffled each time a customer accesses the form so that a given icon (such as the icon 908 printed on the receipt) appears in a random position in the form. Also, other information can be used by an icon-selection routine to select a particular icon to print on the receipt. For example, on any given day, the "Today's Code" may be fixed, but the icon 908 may vary with the amount spent, the time of day and the transaction number, and that further information may be entered into the form 1000 as an integrity check to ensure that the player is an actual customer and not someone attempting to gain access to e-points.

Another printed receipt 1100 which includes a validation code 1102 is shown in FIG. 11. The validation code may comprise any of the codes previously described, and most preferably has a form (e.g., alphanumeric characters) which readily can be printed along with the other details of a given purchase transaction by a printer that is connected to the point of sale (POS) terminal. The receipt typically includes other purchase transaction details and information, as described above.

Figure 12:
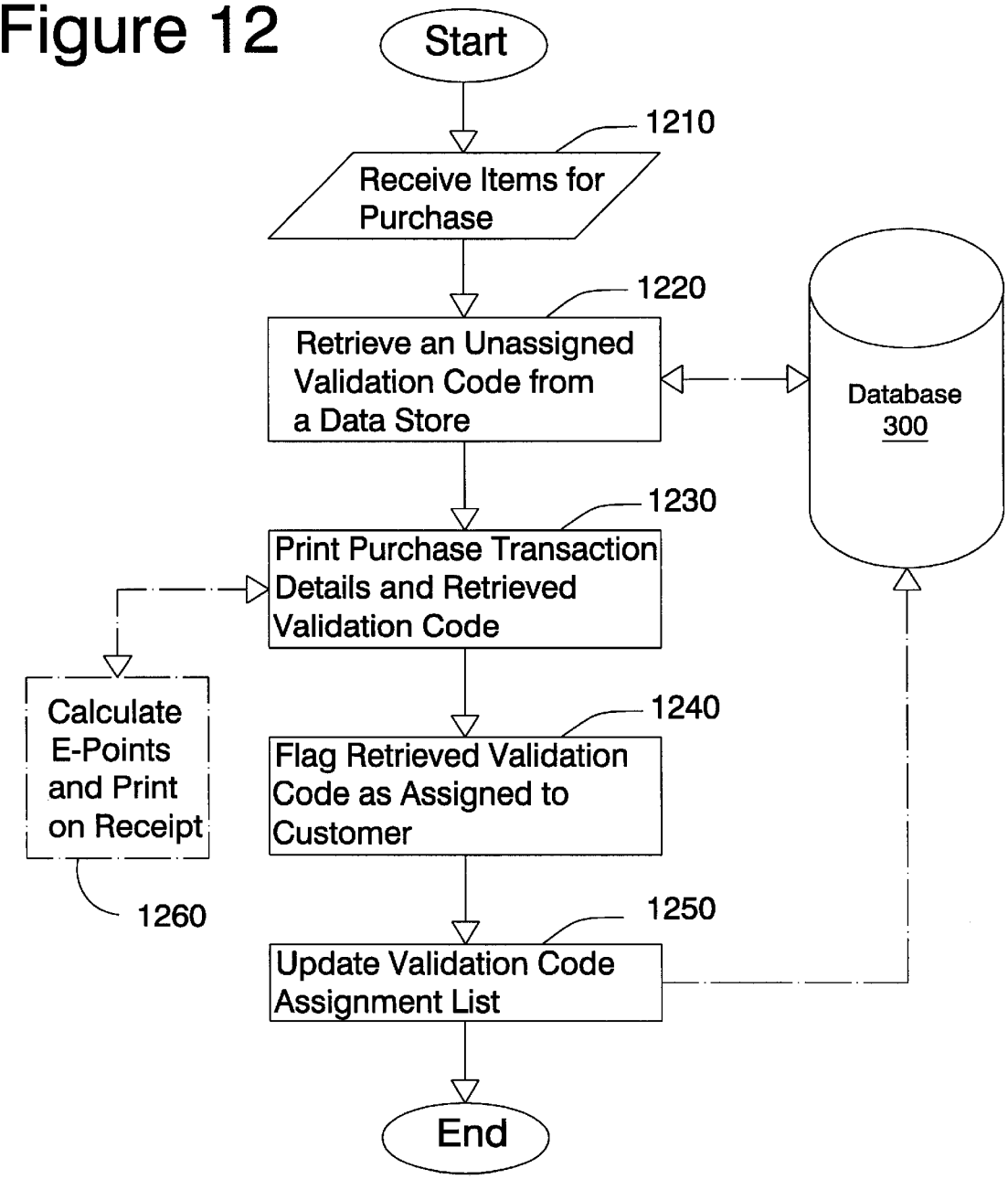
FIG. 12 illustrates a flow diagram in accordance with the second embodiment of the invention.

In addition to conventional processing, a POS terminal which distributes validation codes in accordance with this aspect of the invention is configured to print a unique validation code on the receipt for each purchase transaction. In FIG. 12, the POS terminal receives items for purchase by the customer at step 1210 in any conventional manner such as by keying in the price or code of a product or by scanning a machine-readable code on the product's packaging. An unassigned validation code is preferably retrieved at step 1220 from a data base such as the database 300 or other central data store. At some time before a purchase receipt is fully printed (including a time just before the purchase items are received), at step 1230, the POS terminal prints the purchase transaction details along with the retrieved validation code onto a receipt.

The retrieved validation code may be flagged as having been assigned to a customer as at step 1240 and the database of validation codes used by the POS terminal then may be updated at step 1250 to ensure that each validation code is printed on only one receipt. Instead of flagging the validation code as having been assigned to a customer (that is, having been printed on a receipt), the validation code can be removed (e.g., popped) from the list of remaining unassigned validation codes.

It should be understood that more than one POS terminal may access the same data store of validation codes. Each POS terminal is connected either directly or indirectly through a network to the host system 302 so that it has access the validation codes in the database 300. The connection can be continuous, for example, using a dedicated line, or temporary, for example, using a modem or the like. Because of the POS terminal has access to the entire series of validation codes in the database 300, players can be provided with unique validation codes on each of their register receipts instead of on pre-printed game cards, with a predetermined number of e-points being associated with each such receipt, or with a dynamically determined number of e-points awarded upon registering the validation code, as described above under section headings A and B above.

The validation codes can be retrieved directly from the database 300 or from a local data store which has been provided with a number of unassigned validation codes. The unassigned validation codes are available to each POS terminal at a particular store for assigning to respective purchase transactions. The validation codes are retrievable through a program call to a routine or data store which returns the validation code and places it in the printer buffer to be printed on the receipt 900, 1100. The program call may be placed within a receipt-printing routine of the POS terminal so that it is executed along with the other instructions in the print routine. The program call can be configured to flag the validation code as assigned, or cause the validation code to be removed (e.g., popped) from the list of unassigned validation codes.

D. Purchase Transaction Receipt with Number of E-Points Based on Purchase Transaction Details Another method in accordance with the invention awards e-points on the basis of purchase transactions made by a customer. The number of e-points to be awarded in this embodiment varies with each purchase transaction and so the award must be calculated at the POS terminal or at another machine to which the terminal is connected. At a time shortly after the purchase transaction is made, the computed number of e-points is reported back to the host system 302 along with its assigned validation code for inclusion in the database 300. This enables the customer to enter the code into a suitable redemption form, such as one of the redemption forms of FIGS. 4, 6, 8 and 10. This method may proceed as described above in connection with FIG. 12, except that the number of e-points awarded is calculated and printed on the receipt, as shown in phantom, at step 1260.

The validation codes are preferably established at the outset of the game and a number of validation codes are distributed to each POS terminal and/or store for printing on individual receipts. Alternatively, the validation code can be generated using the purchase transaction details and then printed at step 1230 onto the receipt. The validation code along with the awarded number of e-points is thereafter provided to the host system 302. A suitable validation code generator is described in U.S. Pat. No. 5,892,827 of Beach et al.

E-point awards can be valued at one point per penny spent, can be awarded in rounded amounts (i.e., by the tens or hundreds), and other correlations between amount spent and e-points earned are within the scope of the invention. Thus, differing amounts of e-points can be awarded for the same amount spent, with the variation in the award being a function of the products that were purchased. For example items or services for which there is an excess inventory or an ongoing promotional campaign may be awarded more e-points than other items or services.

E. Game Card or Receipt Validated Online

By distributing validation codes to players and customers which are validated at an internet site (e.g., at a web page maintained by the game-sponsoring organization), the game of the present invention provides players and customers alike with a reason to visit a particular internet site. In accordance with a further aspect of the invention described under the present section heading, the player or customer is given an incentive to return to the retail store, in addition to or instead of an award of e-points.

Figure 13:
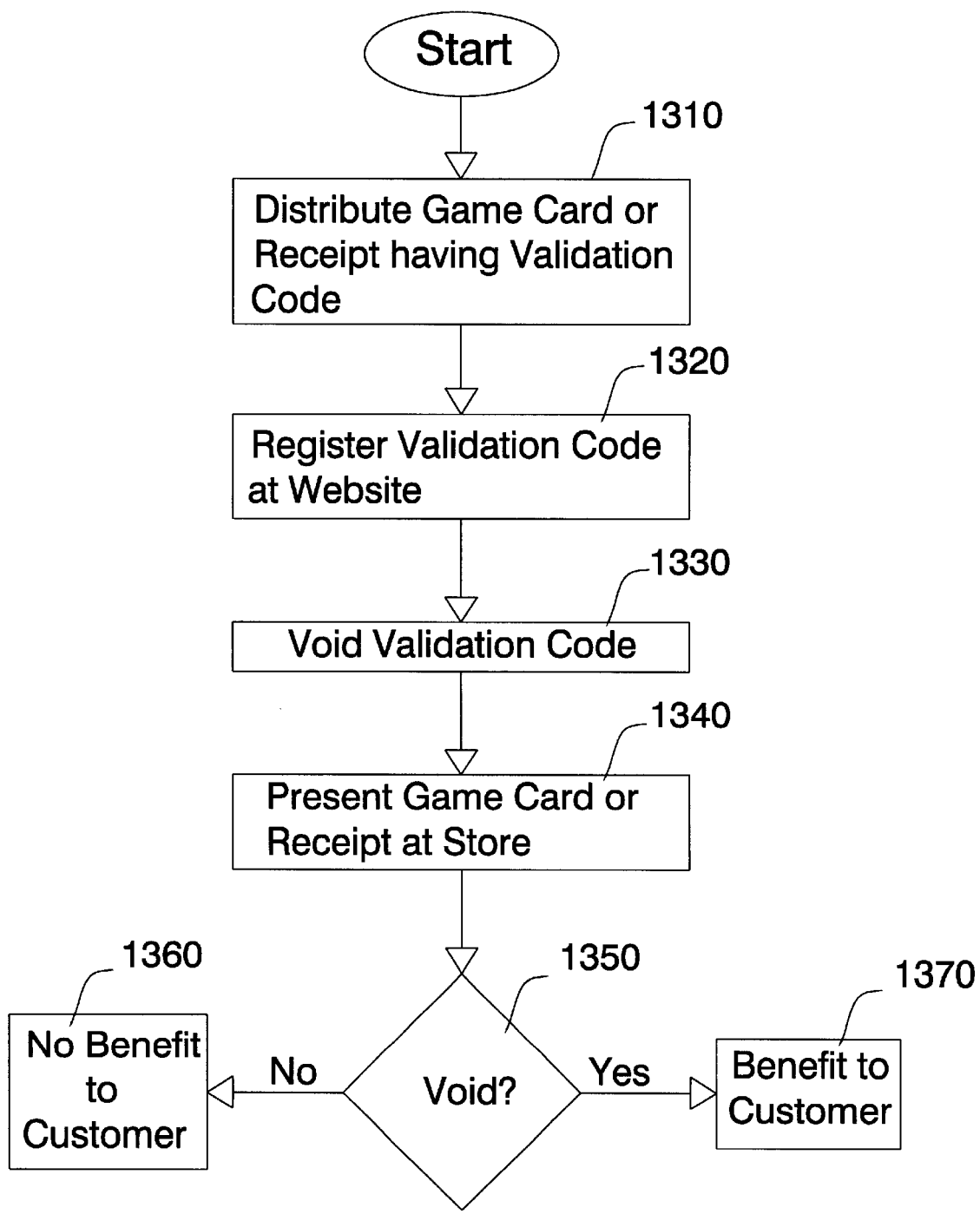
FIG. 13 illustrates a flow diagram in accordance with a third embodiment of the invention.

In FIG. 13, a game card or receipt such as shown in FIGS. 1, 2, 7, 9 and 11, is distributed to a customer at step 1310. The game card or receipt supports a visible validation code, as previously described. The customer thereafter accesses the host system 302 and enters the validation code into a redemption form (see FIGS. 4, 6, 8, and 10). In other words, the validation code is received at a designated internet site. At step 1320, the validation code is registered at the designated internet site, which is maintained at the host system 302. As described above, the game card or receipt is "voided" when the validation code entered into the redemption form is received at the designated internet site, as shown at step 1330.

If the customer were to re-enter the validation code into the redemption form, it would register as void. If e-points were awarded the first time that the validation code was entered, none would be awarded on the second attempt to redeem the reward. Thus, with respect to e-point awards, the game card or receipt is exhausted.

However, the "void" status of the game card or receipt has a second use when presented at a predetermined store, as at step 1340. The store either scans the machine readable code on the game card or receipt (see codes 104, 204, 706) or the validation code is entered at the POS terminal (or another terminal in communication with the validation code database). At step 1350, the terminal determines whether the validation code on the card was previously voided online by accessing a data store in communication with (or which is the same as) the database 300 or whichever data store maintains the voided-card status information. If the code was not previously voided then the customer receives no further benefit (step 1360). However, if the card tendered by the customer was voided online, then the customer receives a benefit for returning to the store, for example, a free item or a discount on the present or a subsequent purchase at that store or some other store. In this manner, the invention directs consumer traffic to a designated internet site or service and then to a store, for example, the store where the game card (or receipt) was initially obtained.

It should be understood that the customer may have to click-through several screens at the designated internet site to get to the redemption pages. This permits the game sponsors to present the player/customer with other information including advertisements, catalog items and promotional materials up to and perhaps including the display of the redemption form.

The invention has utility in environments other than fast food chains, clothing retailers, and commercial internet sites. The invention may be used to encourage customers to view information related to something he or she has experienced or to return to the theater or go to a designated store, as described in the following Examples.

EXAMPLE 1

A customer purchases a movie ticket having a visible validation code printed on it, as in FIGS. 9 and 11. The validation code from the ticket stub is entered at an internet site maintained by the theater, movie studio, or other sponsor. Upon registering the validation code in a redemption form as previously described, the customer may now view further information about the movie just seen or future movies or other information that is not available to the public unless they have earned e-points or have registered a validation code.

EXAMPLE 2

A customer purchases a movie ticket as in the prior example, and enters the validation code from the ticket stub into a redemption form at a site on the internet. The validation code is voided by the act of registering it. The customer may now present the voided movie ticket stub at one or more designated theaters or stores for a benefit, e.g., a discount on a subsequent movie or other items. This benefit may be time restricted, that is, may require the customer to visit a dirt-world store within two weeks of either voiding the ticket stub or seeing the movie.

The machine 304 at which the validation codes are received can be a computer or television configured for two-way communication (e.g., a television which is connected to a telephone line or two-way communication cable line or fiber optic link) or other interactive device which has both input and output devices connected to convey information to and from an internet site. Exemplary input devices include a mouse, joystick, keyboard, remote control, touch screen switch panel, acoustic-wave interference-sensing switch panel, and microphone. Exemplary output devices include a CRT, LCD, plasma display, and loudspeaker. One or more of these input and output devices can be included in the machine 304. After entering the validation code(s) into the machine, the player is awarded a number of e-points as previously described.

It should be understood that an arbitrary number of alphanumeric characters can be used for the validation code on a game card or receipt. The master code 106, for example, may comprise seven alphanumeric characters selected from A–Z and 0–9, which provides 78,364,164,096 possible master codes (i.e, unique game cards). If lower-case alphabetic characters are also used, then the seven characters provide 3,521,614,606,208 (3.5+ trillion) unique game cards. The sub-code 108 need only be one number or character to permit the customer to make a selection. However, to minimize fraudulent redemption, it is preferred that the same sub-codes not appear on every card and that multi-character sub-codes be used as shown on game-card 100 (note that three case-sensitive alphanumeric characters provide 238,000+ unique sub-codes). When a seven character master-code and three character sub-code are used in a case-sensitive system, 3.5 trillion game-cards can be printed, with over 839 quadrillion assignable codes. As noted above, a single validation code can be used in lieu of separate master-codes and sub-codes. Depending on the implementation, a single code may not be as user-friendly to enter, but will greatly increase the number of combinations for the same total number of alphanumeric characters or icons being used.

When the validation code is not pre-printed and is instead to be printed on a register receipt, the validation code can be dynamically generated in real-time, as described in U.S. Pat. No. 5,892,827 of Beach et al., the disclosure of which is hereby incorporated by reference as if set forth in its entirety herein. The system of the '827 patent provides an alternative technique to ensuring that each customer is provided with an unique validation code that can be used to redeem an award.

As used herein, the term "game card" is intended to broadly refer to any medium which can display the validation codes, and includes printed as well as "virtual" game cards that may be displayed on a display screen such as a CRT, LCD or plasma display. Printed cards may be distributed at dirt-world stores whereas virtual cards are distributed at internet sites. Game cards can be given away or sold to the player. A "store" at which a game card (or more particularly, a "virtual" game card) may be distributed includes internet sites, within the meaning of the present specification, and the game card can be tendered to such a "store" by accessing that internet site at a time after the game card has been voided, for example, after browsing one or more game-sponsor designated sites at which the a redemption form is provided for registering the validation code.

While the invention has been described in detail with particular reference to certain embodiments thereof, the invention is capable of different embodiments and its details are capable of modifications in various obvious respects. As would be readily apparent to those skilled in the art, variations and modifications can be affected while remaining within the spirit and scope of the invention. For example, the validation codes may be "distributed" orally, e.g., by a radio announcer, so that the players/listeners have to jot down the code on a piece of paper or memorize it until such time that they enter the validation code into a redemption form, as previously described. Accordingly, the foregoing disclosure, description, and Figures are for illustrative purposes only, and do not in any way limit the invention, which is defined only by the claims.

We claim:

1. A method for encouraging an individual to visit a designated Internet site prior to visiting one or more dirt-world stores, comprising the steps of:

a) obtaining a code from the individual at the designated Internet site, the code being printed on a supporting medium;

b) thereafter, receiving the supporting medium having the printed code from the individual at one of the dirt-world stores; and c) providing a benefit to the individual if the received code matches the obtained code.

2. The method as in claim 1, including the additional step of distributing the code that is obtained in step (a) to the individual in response to a purchase transaction and prior to step (a).

3. The method as in claim 2, including the additional step of voiding the received code after step (c).

4. The method as in claim 1, including the additional step of electronically comparing the received code to the obtained code for a match prior to step (c).

5. The method as in claim 1, wherein the receiving step comprises scanning a machine readable version of the code at a point of sale terminal.

6. A method for encouraging a customer to visit a designated Internet site prior to visiting a predetermined dirt-world store, comprising the steps of:

a) providing a visible validation code to the customer;

b) receiving the validation code at the designated Internet site;

c) voiding the received validation code; and d) providing the customer with a benefit at the predetermined dirt-world store if the customer tenders the voided validation code.

7. The method as in claim 6, wherein the visible validation code is provided on one of a game card, a receipt, product packaging, and a product label.

8. The method as in claim 6, wherein step (d) includes the step of electronically comparing the tendered validation code to the received validation code for a match and providing the customer with the benefit in response to the match.

9. A promotional campaign for rewarding consumers who interact with a designated Internet site prior to visiting a predetermined dirt-world store, comprising the steps of:

a) distributing a code to the individual at the predetermined dirt-world store;

b) obtaining the code from the individual at the designated Internet site;

c) thereafter receiving the code from the individual at the predetermined dirt-world store; and d) providing a benefit to the individual only if the received code matches an obtained code.

10. The promotional campaign as in claim 9, wherein the predetermined dirt-world store is one store in a chain of stores.

11. The promotional campaign as in claim 9, wherein the benefit can be redeemed without the customer's identity being disclosed.

12. The method as in claim 9, wherein the visible validation code is provided on one of a game card, a receipt, product packaging, and a product label.

* * * * *